(12) United States Patent  (10) Patent No.: US 9,413,264 B2
Ratnaparkhi et al.  (45) Date of Patent: Aug. 9, 2016

(54) GROUND POWER UNIT FOR AIRCRAFT

(75) Inventors: Milind Ratnaparkhi, Dayton, OH (US);
Keith Welker, Troy, OH (US)

(73) Assignee: ILLINOIS TOOL WORKS INC.,
Glenview, IL (US)

( * ) Notice: Subject to any disclaimer, the term of this patent is extended or adjusted under 35 U.S.C. 154(b) by 1067 days.

(21) Appl. No.: 12/723,365

(22) Filed: Mar. 12, 2010

(65) Prior Publication Data
US 2011/0133573 A1  Jun. 9, 2011

Related U.S. Application Data

(60) Provisional application No. 61/267,351, filed on Dec. 7, 2009.

(51) Int. Cl.
*H02J 3/36* (2006.01)
*H02M 7/217* (2006.01)
*B64F 1/36* (2006.01)
*H02M 3/337* (2006.01)
*H02M 1/00* (2006.01)

(52) U.S. Cl.
CPC ............. *H02M 7/217* (2013.01); *H02J 3/36* (2013.01); *B64F 1/36* (2013.01); *H02M 3/337* (2013.01); *H02M 2001/007* (2013.01); *Y02T 50/82* (2013.01)

(58) Field of Classification Search
CPC ........................................................ H02J 3/36
USPC ........................................................ 307/151
See application file for complete search history.

(56) References Cited

U.S. PATENT DOCUMENTS

| | | | | |
|---|---|---|---|---|
| 5,355,024 A | * | 10/1994 | Elliott et al. | 307/73 |
| 5,561,595 A | * | 10/1996 | Smith | 363/37 |
| 6,046,551 A | * | 4/2000 | Kita | 315/307 |
| 6,191,961 B1 | * | 2/2001 | Mous | 363/47 |
| 6,320,773 B1 | | 11/2001 | Urish et al. | |
| 6,664,762 B2 | * | 12/2003 | Kutkut | 320/116 |
| 6,731,525 B2 | * | 5/2004 | Meiners | 363/148 |

(Continued)

FOREIGN PATENT DOCUMENTS

WO  2009058680 A1  5/2009

OTHER PUBLICATIONS

Stmicroelectroics; STW9N150; N-channel 1500V-2.2-8A-to-247; Very High Voltage PowerMESH Power MOSFET; May 2007.

(Continued)

*Primary Examiner* — Adi Amrany
(74) *Attorney, Agent, or Firm* — Fletcher Yoder P.C.

(57) ABSTRACT

Embodiments of a ground power unit are disclosed for providing power to a grounded vehicle, such as an aircraft. In accordance with certain embodiments, the ground power unit (GPU) accepts a wide range of AC input voltages and is capable of providing a range of DC output voltages. The GPU may include a switched rectifier that converts an AC input signal to a DC link signal. The DC link signal is then converted to a switched DC signal that simulates an AC-like sine wave using a high frequency DC-to-DC switching converter. A single-phase transformer modulates and isolates the switched DC signal, which is subsequently converted to a DC output signal using diode rectifiers coupled to the secondary winding of the transformer. The disclosed GPU may be controlled using a software-based control algorithm that controls the AC input parameters independently of the DC voltage parameters.

33 Claims, 5 Drawing Sheets

(56) References Cited

U.S. PATENT DOCUMENTS

| | | | |
|---|---|---|---|
| 6,747,881 B2 * | 6/2004 | Schreiber | 363/37 |
| 6,838,856 B2 * | 1/2005 | Raichle | 320/119 |
| 7,269,038 B2 * | 9/2007 | Shekhawat et al. | 363/71 |
| 7,461,516 B2 | 12/2008 | Leadingham et al. | |
| 7,484,689 B2 | 2/2009 | Musial et al. | |
| 7,679,941 B2 * | 3/2010 | Raju et al. | 363/37 |
| 7,701,732 B2 * | 4/2010 | Ranstad | 363/17 |
| 7,787,270 B2 * | 8/2010 | NadimpalliRaju et al. | 363/68 |
| 7,859,870 B1 * | 12/2010 | Schutten et al. | 363/56.02 |
| 8,030,801 B2 * | 10/2011 | Mann et al. | 307/80 |
| 8,085,557 B2 * | 12/2011 | Ito et al. | 363/17 |
| 2004/0189251 A1 * | 9/2004 | Kutkut et al. | 320/128 |
| 2009/0121552 A1 | 5/2009 | Mann, III et al. | |
| 2011/0221279 A1 * | 9/2011 | Ratnaparkhi et al. | 307/151 |
| 2012/0033469 A1 * | 2/2012 | Mohr et al. | 363/98 |

OTHER PUBLICATIONS

Semiconductor Components Industries; Variable Off Time PWM Controller; Nov. 2007, Rev.3; Publication Order No. NCP1351/D.

H. Takano & J. Takahashi; "Comparative Study of Resonant and Non-resonant DC-DC Coverter with Parasitic LC Components of High-voltage Transformer"; Industry Applications Conference, 1998. Thirty-Third IAS Annual Meeting, The 1998 IEEE St. Louis, MO, USA, Oct. 12-15, 1998, New York, NY, USA, IEEE, US, vol. 2, Oct. 12, 1998, pp. 1580-1587.

International Search Report & Written Opinion for application No. PCT/US2011/056880 mailed May 7, 2012.

* cited by examiner

GROUND POWER UNIT FOR AIRCRAFT

CROSS REFERENCE TO RELATED APPLICATIONS

This application is a Non-provisional patent application of U.S. Provisional Patent Application No. 61/267,351, entitled "GROUND POWER UNIT FOR AIRCRAFT", filed Dec. 7, 2009, which is herein incorporated by reference.

BACKGROUND

The present disclosure relates generally to ground support equipment for aircraft and, more specifically, to ground power units for providing electrical power to an aircraft.

In the aviation industry, a wide variety of ground support equipment is available to provide electrical power and conditioned air, among other things, to aircraft. As will be appreciated, many aircraft are capable of generating their own electric power, such as through the use of onboard generators powered by the aircraft engines. However, because the generation of power by the aircraft engines consumes fuel, it is generally desirable to disable such engines when an aircraft will be stationary on the ground for any sustained period.

Because the internal power generation systems of such aircraft depend on the operation of the engines, and because aircraft are rarely configured to directly interface with power ordinarily available at a facility, external ground power units (GPUs) are frequently utilized to supply electric power to components and systems of aircraft when the aircraft engines are not in operation. For instance, GPUs may be advantageously utilized to provide electric power to aircraft parked at airport terminals, in hangers, on runways, or at some other location, which facilitates operation of a number of aviation systems, including communications systems, lighting systems, avionics, air conditioning systems, and the like, while the aircraft engines are powered down. Additionally, the power provided by GPUs may supplement power provided during operation of the engines while an aircraft is on the ground.

As will be appreciated by one skilled in the relevant art, not all aircraft are designed to utilize power having the same characteristics. For instance, some aircraft utilize alternating current (AC) power, while others utilize direct current (DC) power. Further, even if two aircraft use power having the same type of current, the two aircraft may use power having different voltage characteristics from one another. Because conventional GPUs are generally configured to produce a specific output power, it is common to have a separate ground power unit or cart for each aircraft power standard that may be encountered. Thus, there is currently little alternative but to design, build and operate ground power units specifically designed to provide one type of power or another. However, buying, providing and maintaining GPUs for each power standard is inefficient and increases the costs associated with supporting a variety of aircraft types.

There exists a need, therefore, for an improved ground power unit system that supports a range of input frequencies and voltages, and is able to accommodate the power requirements for a variety of aircraft types.

BRIEF DESCRIPTION

Embodiments of a ground power unit are disclosed for providing power to a grounded vehicle, such as an aircraft. In accordance with certain embodiments, the ground power unit (GPU) accepts a wide range of AC input voltages and is capable of providing a range of DC output voltages. The GPU may include a switched rectifier that converts an AC input power to a DC link power. The DC link power is then converted to a switched DC signal that simulates an AC-like sine wave using a high frequency DC-to-DC switching converter. A single-phase transformer modulates and isolates the switched DC signal, which is subsequently converted to a DC output signal using diode rectifiers coupled to the secondary winding of the transformer. The disclosed GPU may be controlled using a software-based control algorithm that controls the AC input parameters independently of the DC voltage parameters. For instance, in one embodiment, the GPU includes control logic that measures the AC input voltage and determines an appropriate switching pattern for the switched rectifier. The output of the rectifier (e.g., a DC link power) is then measured, and the DC-to-DC switching converter is controlled to operate at a duty cycle that achieves a desired output voltage.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed further below, various embodiments of a ground power unit are provided to support a variety of applications, such as providing ground power to aircraft, having different power requirements. For instance, disclosed embodiments of the ground power unit (GPU) may support a wide range of AC input voltages and provide a range of DC output voltages. In one embodiment, the GPU may include a switched rectifier configured to convert an AC input signal to a DC link signal. A high frequency DC-to-DC switching converter then converts the DC link signal to a switched DC signal that simulates a sine wave based upon a duty cycle determined by control circuitry for achieving a desired DC output level. A single-phase transformer modulates and isolates the switched DC signal, which is then rectified to the desired DC output signal using diode rectifiers coupled to the secondary winding of the transformer. In certain embodiments, the GPU may be controlled using a software-based algorithm that controls the AC input parameters independently of the DC voltage parameters. For instance, in one embodiment, the control algorithm measures the AC input signal and determines an appropriate switching pattern for the switched rectifier. The output of the rectifier (e.g., a DC link power) is then measured, and the DC-to-DC switching converter is controlled to operate at a duty cycle that achieves the desired output voltage.

Figure 1:
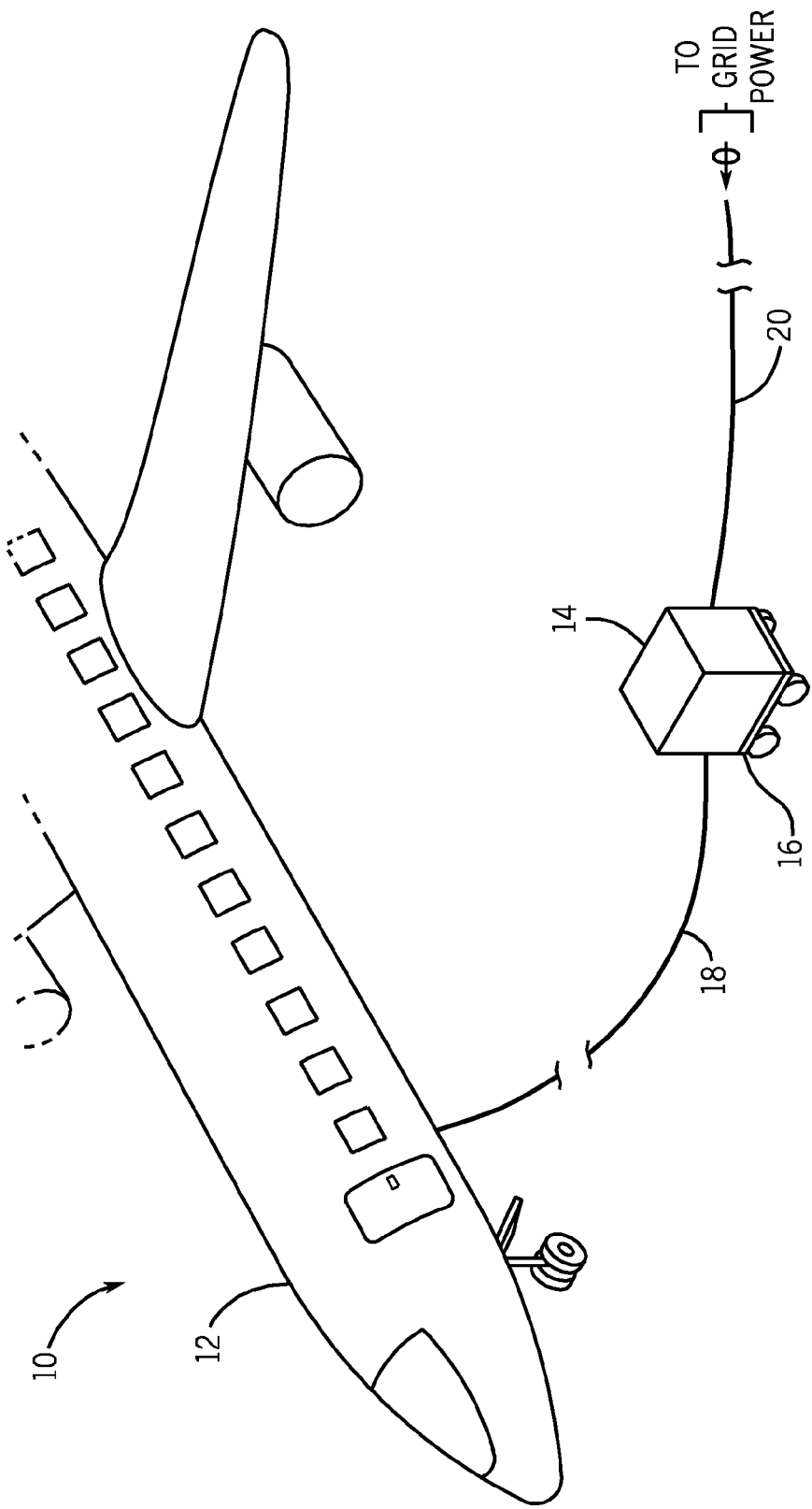
FIG. 1 illustrates a perspective view of an aircraft coupled to a ground power unit, in accordance with one embodiment of the present technique.

Turning now to the drawings, FIG. 1 illustrates a grounded aircraft system 10 that includes a grounded aircraft 12 and a ground power unit (GPU) 14 in accordance with aspects of the present disclosure. As discussed above, the GPU 14 may supply power to the aircraft 12 while the aircraft 12 is grounded. In certain embodiments, the grounded aircraft 12 may be a military aircraft, such as a military jet, helicopter, or carrier airplane, or may be any commercial or private aircraft, such as a commercial aircraft for transporting civilian passengers, or a cargo or freight aircraft.

The system 10 may include a cart 16 for supporting the GPU 14 and facilitating the transport of the GPU 14 from one location to another. The GPU 14 may thus provide output power for powering one or more components of the grounded aircraft 12 by way of the power cable 18. Further, in the embodiment depicted in FIG. 1, power may be supplied to the GPU 14 from an external power source or grid by way of an input power cable 20. In this manner, the aircraft 12 may continue to operate a variety of onboard systems, such as air conditioning systems and electrical systems, without having to generate its own power via onboard generators (e.g., aircraft engines), thereby conserving fuel. Further, in another embodiment, rather than utilizing the cart 16, the GPU 14 may have wheels integrally coupled thereto to facilitate transportation of the GPU 14.

As discussed above, in accordance with embodiments of the present invention, the GPU 14 may be configured to accept a wide range of AC input voltages ($V_{AC}$) and frequencies, and to convert the AC input to a desired DC voltage for supporting a variety of aircraft types. As will be discussed further below, the configuration of the GPU 14 to accept different AC inputs is automatically set by a control algorithm (e.g., does not require manual intervention when a change in input voltage is detected) that senses the AC input and adjusts the switching of certain components (e.g., a rectifier and DC-to-DC converter) automatically. For instance, in one embodiment, the GPU 14 may accept any input voltage between approximately 200 $V_{AC}$ and 600 $V_{AC}$. The GPU 14 may also be configured to accept single-phase or three-phase AC input voltage at line frequencies of 50 or 60 Hz. In one embodiment, the GPU 14 may further be configured to accept a 400 Hz AC input voltage. By way of example only, Table 1 below depicts a range of AC input voltages, as well as frequencies and phases that may be supported by an embodiment of the GPU 14. As indicated in Table 1, the GPU 14 may be configured to accept input voltages between approximately 200 $V_{AC}$ and 600 $V_{AC}$, with a tolerance of 10 percent.

TABLE 1

| Frequency/Phases | Line-to-Line Voltage $V_{RMS}$ |
| --- | --- |
| 50 hertz, 3-phase | 220 V (+/−10%) |
|  | 380 V (+/−10%) |
| 50 hertz, 1-phase | 220 V (+/−10%) |
| 60 hertz, 3-phase | 208 V (+/−10%) |
|  | 230 V (+/−10%) |
|  | 460 V (+/−10%) |
|  | 575 V (+/−10%) |
|  | 600 V (+/−10%) |
| 60 hertz, 1-phase | 230 V (+/−10%) |
| 400 hertz, 3-phase | 200 V (+/−10%) |

Figure 2:
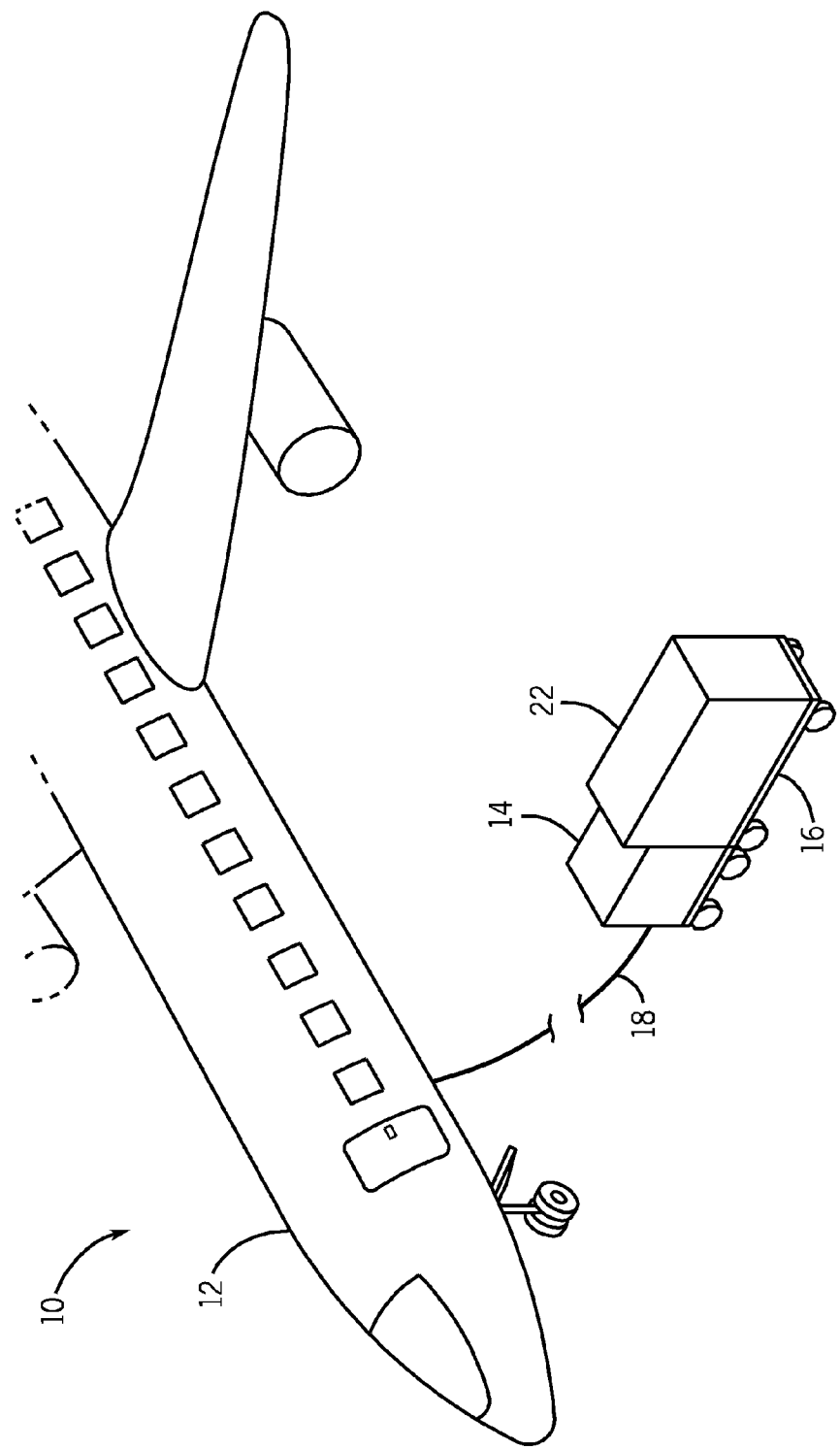
FIG. 2 illustrates a perspective view of an aircraft coupled to a ground power unit, in accordance with another embodiment of the present technique.

FIG. 2 illustrates an alternate embodiment of the system 10, in which the GPU 14, rather than receiving power from a grid, receives power by a combination of an engine and generator 22 (e.g., an engine-generator unit). For instance, the GPU 14 may be electrically coupled to a standalone engine-generator unit 22. The cart 16 may be designed to support both the GPU 14 and the engine-generator 22, or separate respective carts may support each of the GPU 14 and the engine-generator unit 22. As will be appreciated, such a configuration may be particularly well-suited in situations where grid power is not readily available or is not conveniently located in close proximity to the aircraft 12.

Figure 3:
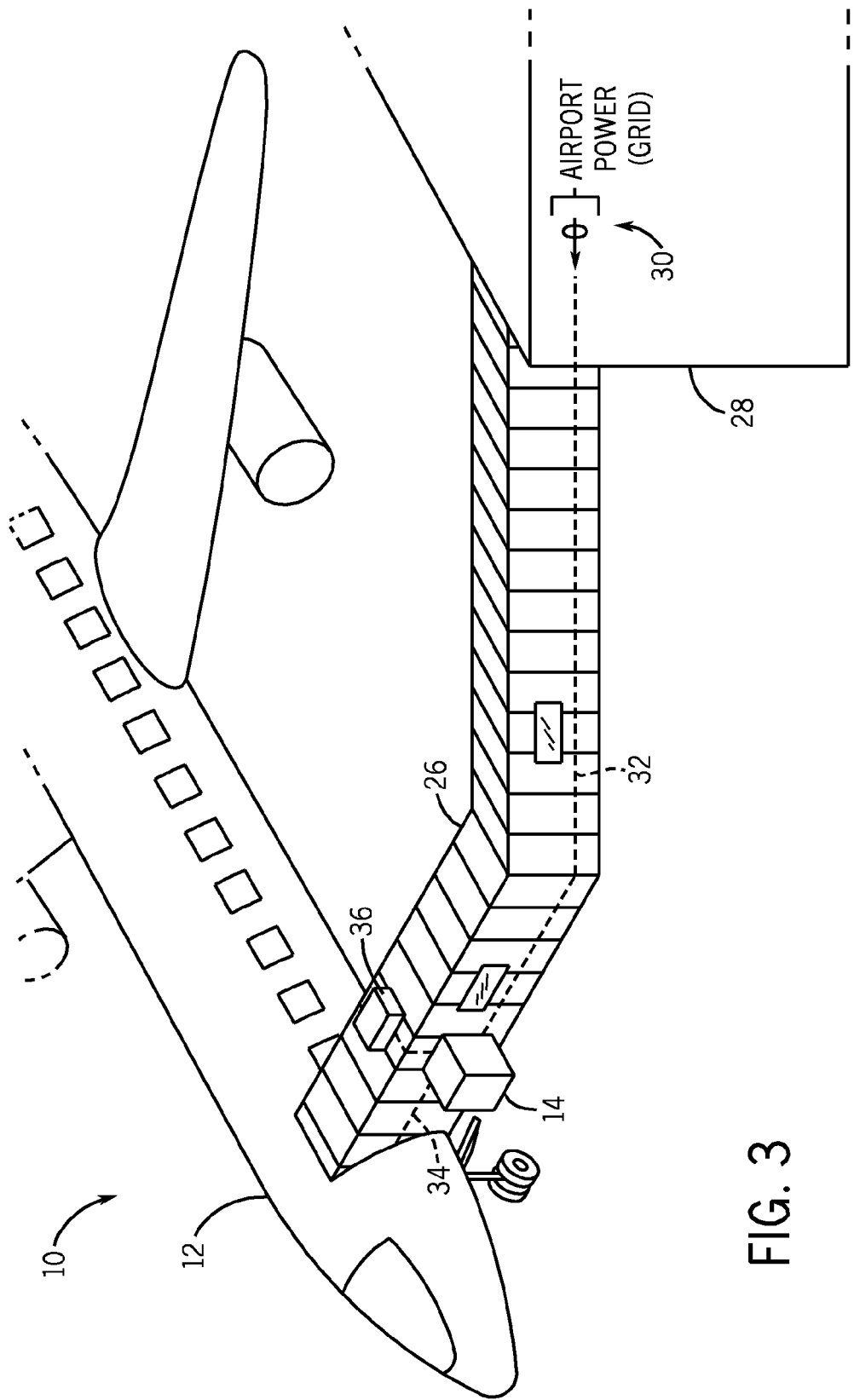
FIG. 3 illustrates a perspective view of an aircraft coupled to a ground power unit that is integrated into a jet bridge, in accordance with a further embodiment of the present technique.

FIG. 3 illustrates a further embodiment of the system 10, in which the GPU 14 is integrated into a jet bridge 26 connected to an airport terminal or gate 28. For instance, as shown in FIG. 3, the GPU 14 may be coupled to an outer wall 30 of the jet bridge 26. In this manner, power may be supplied to the GPU 14 from the airport power source 30 (e.g., grid power) by way of a power cable 32, and the GPU 14 may provide output power to the aircraft by way of a power cable 34. In certain embodiments, the power cables 32 and 34 (shown in phantom in FIG. 3) may be enclosed within the walls of the jet bridge 26 and hidden from the view of passengers entering and exiting the aircraft 12 through the jet bridge 26. As will be appreciated, the configuration of the system 10 shown in FIG. 3 reduces the components (e.g., the GPU 14 and power cables 32, 34) that are present on the ground. Further, the integration of the GPU 14 into the jet bridge 26 ensures that the GPU 14 is available whenever a grounded aircraft 12 is present at the airport gate 28, thus reducing the need to transport a GPU 14 from a remote location to the airport gate 28 each time an aircraft 12 arrives. Referring still to FIG. 3, in an alternate embodiment, the jet bridge 26 may also include a 400 hertz converter 36. In such an embodiment, the GPU 14, instead of receiving power from the airport power source 30, may receive power from the 400 hertz converter 36.

Figure 4:
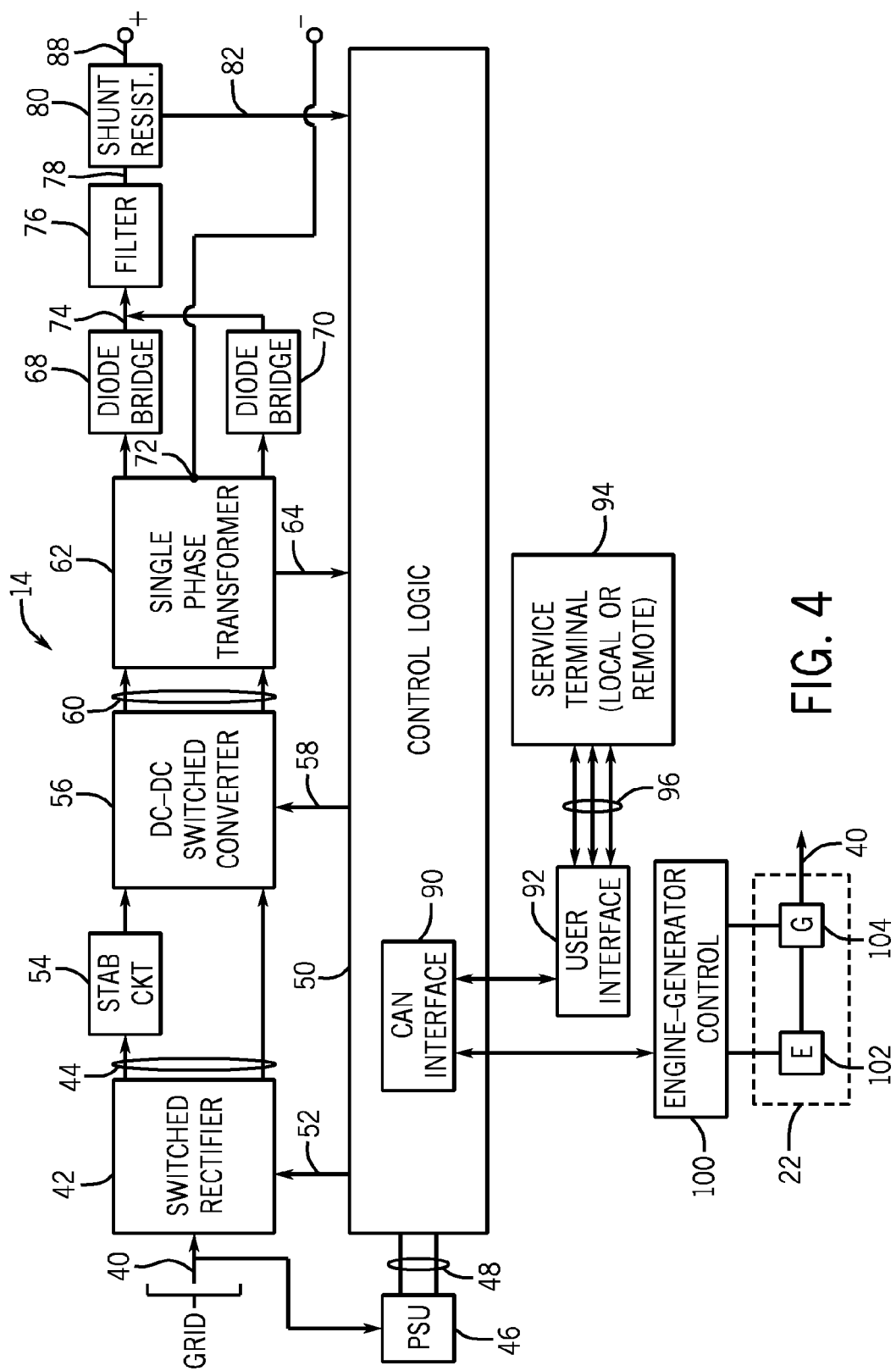
FIG. 4 is a functional block diagram depicting components of a ground power unit, in accordance with an embodiment of the present technique.

Referring now to FIG. 4, a functional block diagram depicting components of an embodiment of the GPU 14 is illustrated, in accordance with an embodiment of the invention. As shown the GPU 14 may receive an AC input power signal 40 from either a grid or an engine-generator unit 22. As discussed above, the input power signal 40 may be single-phase or three-phase, and may be between 200 to 600 $V_{AC}$. Additionally, the input power signal 40 may have a frequency of 50, 60, or 400 Hz. A switched rectifier 42 receives the input power signal 40 and rectifies it to a high DC link voltage, referred to herein by reference number 44. Further, in the illustrated embodiment, the AC input power signal 40 may also be received by a DC power supply unit 46 configured to convert the AC input voltage into multiple DC voltage inputs 48. For instance, in one embodiment, the DC inputs 48 may include a 24 $V_{DC}$ signal for powering the control logic 50, and a 15 $V_{DC}$ signal, which may be used to drive the switching devices in the DC-to-DC switched converter 56, as will be discussed further below.

The switched rectifier 42 may include one or more solid-state semiconductor switching devices, such as silicon controller rectifiers, thyristors, diodes, and so forth. The switching of the rectifier 42 may be controlled via control signals 52 determined by control logic 50. For instance, in one embodiment, the rectifier 42, under the control of the signals 52, may produce a DC link voltage 44 that is approximately 1.34 times the $V_{RMS}$ of the AC input voltage. The DC link voltage 44 is then received by stabilization circuitry 54 which may be configured to provide power factor and/or harmonic improvements to the DC link voltage signal 44. Depending on the AC input voltage, the rectified DC link voltage may be a high level DC voltage, such as between approximately 600 to 900 $V_{DC}$.

Next, the DC link voltage 44 is then brought down to a lower level voltage by the DC-to-DC switched converter 56. As will be discussed further below, the DC-to-DC switched converter 56 may be implemented in one embodiment as a full bridge converter, which may include insulated-gate bipolar transistors (IGBTs) configured in an H-bridge arrangement. The duty cycle of the converter 56 may be modulated using a control algorithm executed by the control logic 50. For instance, as shown in FIG. 3, the control logic 50 may measure the DC link voltage 44 and output the control signals 58 to the converter 52 to control switching of the transistors, and thus the duty cycle of the converter 52, to achieve a desired output voltage level. In this manner, the controls needed for generating the desired DC levels are independent of the AC inputs. As will be appreciated, this effectively provides a DC supply voltage that is independent of the AC input. The converter 56 may utilize high speed switching frequencies of between approximately 10 kHz to 20 kHz, and may output DC square wave pulse signals 60 that simulate a sine wave. In one embodiment, the converter 56 may operate at a generally constant 20 kHz switching frequency to reduce or substantially eliminate noise. By utilizing this high switching frequency, the GPU 14 is able to accept 400 Hz AC inputs directly. The converter 56 may also utilize a zero voltage switching technique, such that the pulse width is modulated only when required by the output load (e.g., on the output terminal 88 side). By utilizing zero voltage switching, voltage spikes, switching losses, heat, and electromagnetic interference (EMI) may be reduced.

The DC output signal 60 of the converter 56 drives a primary winding of a single-phase transformer 62, which drops the switched DC voltage signal 60 to a desired output level. The secondary pulse of the transformer 62 is center tapped (e.g., grounded), as indicated by reference number 72, to provide a floating reference point for the DC output. Further, as shown in the presently illustrated embodiment, the current across the transformer 62 is provided to the control logic 50, as indicated by reference number 64, where it is used for controlling the switching of the IGBTs in the converter 56 via diode conduction. As will be appreciated, the use of a single phase transformer 62, as shown in FIG. 4, replaces larger and bulkier multi-phase transformers common in conventional ground power units. Thus, the GPU 14 may exhibit substantial weight reduction and less complex components compared to certain conventional GPU devices. By way of example, in some embodiments, the GPU 14 may exhibit a weight reduction of between 250 to 750 pounds when compared to certain conventional GPU devices.

The positive and negative outputs of the secondary winding of the transformer 62 are then rectified by the diode bridges 68 and 70, respectively, to produce the desired DC output. As depicted, the diode bridges 68 and 70 may be arranged in a parallel configuration to accommodate large startup currents. The rectified DC output 74 from the diode bridges 68 and 70 is further stabilized by filtering circuitry 76. For instance, the filtering circuitry 76 may filter and reduce current ripple and/or voltage ripple in the rectified DC signal 74. A shunt resistor 80 is coupled in the path of the filter DC output 78, and typically has a very low resistance (e.g., milliohms). The shunt resistor 80 functions to supply a current feedback 82 to the control logic 50 for control and safety purposes without noticeably affecting the DC output 78. The DC output 78 is then supplied to the output terminals 88, whereby it may be transmitted via a power cable (e.g., 18 in FIGS. 1 and 2, or 34 in FIG. 3) to a load (e.g., aircraft 12). In certain applications, such as for powering grounded aircrafts (e.g., 12), the GPU 14 may be configured to provide a DC output voltage of 28 $V_{DC}$.

However, in accordance with disclosed embodiments, the GPU 14 may be capable of providing anywhere from between approximately 14 to 56 $V_{DC}$. As discussed above, the desired DC output voltage may be modulated by adjusting the duty cycle of the converter 56.

The control logic 50 may include one or more processors, such as a microprocessor, ASIC, or FPGA configured to execute a control algorithm. By way of example, the control algorithm may be provided as machine-readable encoded instructions stored on a machine-readable medium, such as memory, a hard-drive, an optical storage device, an EEPROM, a flash memory device, or the like. The control algorithm may provide the control signals 52 and 58 for controlling the switching of the rectifier 42 and the converter 56, respectively, as mentioned above. For instance, in one embodiment, the control algorithm measures the AC input voltage 40, and computes the desired switching sequence (e.g., an SCR firing sequence) for the rectifier 42 to achieve the desired DC link voltage 44. The control algorithm also measures the resulting DC link voltage 44 and computes the duty cycle needed to achieve the desired DC output voltage 78. Thus, the DC output of the GPU 14 is driven by controlling the duty cycle of the converter 56 independently of the AC input voltage. The control algorithm may also adjust the DC output voltage 78 for line drop compensation. In this manner, the various levels of compatible AC inputs (e.g., Table 1) and DC outputs (e.g., 14 to 56 $V_{DC}$) are maintained by the software control algorithm. Further, the disclosed GPU 14 may provide for automatic realignment of variable power inputs by adjusting the rectifier switching sequence (e.g., control signals 52) and/or the converter duty cycle (e.g., control signals 58). As such, the disclosed GPU 14 may support a number of applications having different power requirements without requiring the maintenance and upkeep of separate GPUs for different power standards.

As further shown in FIG. 4, the control logic 50 may include a controller area network (CAN) protocol interface 90, enabling the control logic 50 to communicate with the user interface board 92. The user interface board 92 may provide additional commands, such as start, stop, reset, or manual stop (e-stop) commands that may be initiated or called by an operator. For instance, the operator may operate a service terminal 94, which may be located locally or remotely with respect to the GPU 14, and may include an LCD or VFD display panel. The display panel may display current operating parameters, which may be edited or adjusted by an operator. The service terminal 94 may communicate with the user interface board 92 via several interfaces, including universal serial bus (USB), Ethernet, or by the Recommended Standard 232 (RS-232) protocol, as represented by reference number 96. For instance, local service terminals 94 may communicate with the user interface board 92 by RS-232 or USB interfaces, whereas remote service terminals 94 communicate with the user interface board 92 by wired or wireless Ethernet connections.

Further, in a configuration where the AC input power 40 is provided by the engine-generator unit 22 (e.g., system 10 of FIG. 2), the CAN interface 90 may also provide for communication between the control logic 50 and an engine-generator controller 100. In such a configuration, an operator may also control one or more operating parameters of an engine 102 and/or a generator 104 of the engine-generator unit 22 from the service terminal 94. Additionally, in some embodiments, the control logic 50 may include a flash memory card or some other type of storage device for storing operation data (e.g., statistics), fault and/or failure data, and so forth.

Figure 5:
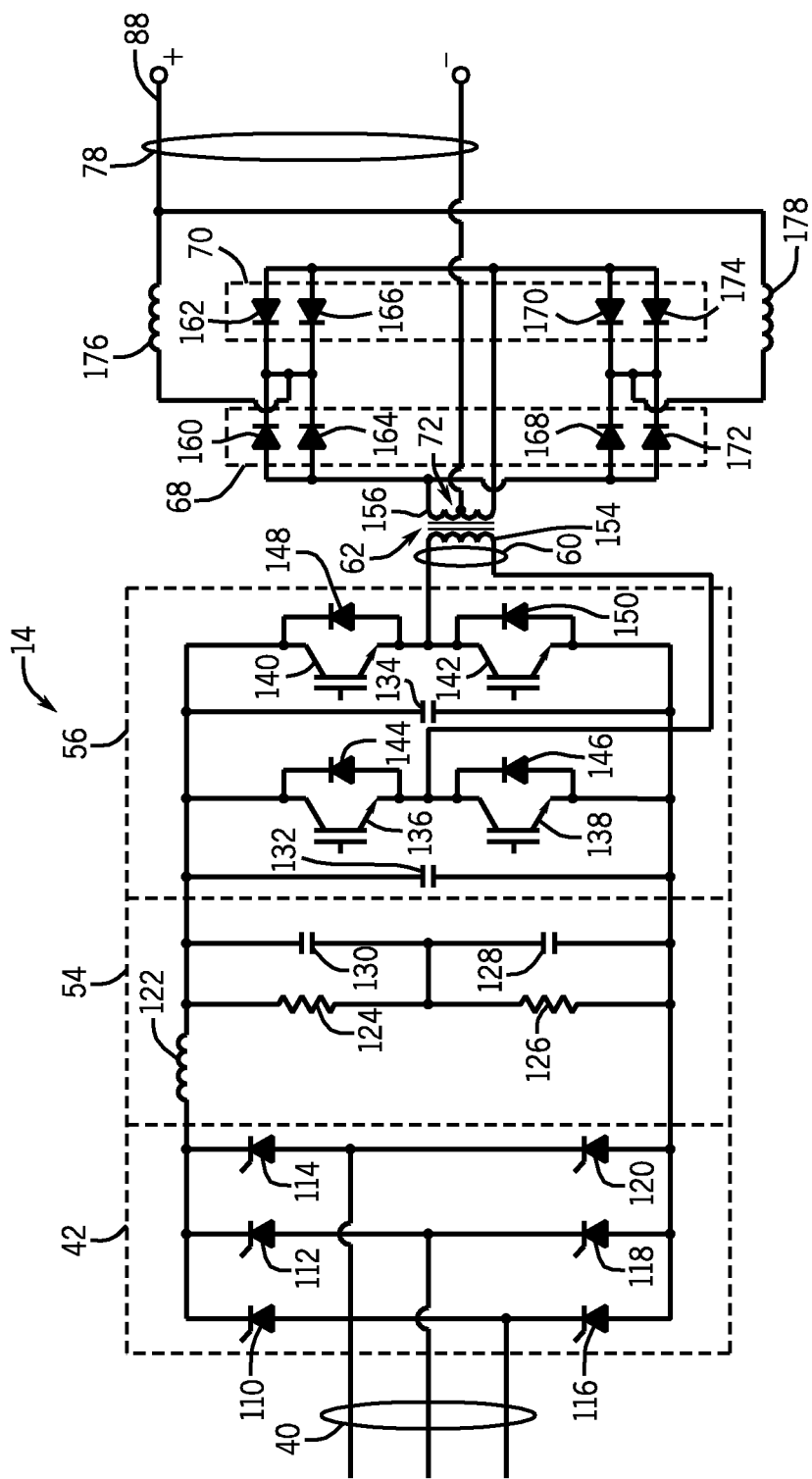
FIG. 5 is a circuit schematic illustrating certain components of the functional block diagram of FIG. 4, in accordance with an embodiment of the present technique.

FIG. 5 shows a circuit schematic that depicts certain functional components of the GPU 14 illustrated in FIG. 4 in more detail. For instance, as shown in FIG. 5, the switched rectifier 42 may be an SCR bridge rectifier that includes the SCRs 110, 112, 114, 116, 118, 120, as arranged in FIG. 5. As discussed above, the SCRs 110-120 may rectify a single-phase or three-phase AC input signal 40 to a DC link voltage 44. The stabilization circuitry 54 receives the DC link voltage 44 and provides power factor and/or harmonic improvements. As shown in FIG. 5, the stabilization circuitry 54 may include the inductor 122, resistors 124 and 126, and capacitors 128 and 130. The inductor 122 may be configured to provide power factor and/or harmonic improvements. Further, the capacitors 128 and 130 are configured to maintain the high level DC link voltage output from the SCR bridge rectifier 42. The resistors 124 and 126 are arranged to balance an even voltage across each of the capacitors 128 and 130.

The DC-to-DC converter 56, as shown in FIG. 5, includes the capacitors 132 and 134, a first set of IGBTs 136 and 138 coupled to the negative side of the primary winding 154 of the transformer 62, and a second set of IGBTs 140 and 142 coupled to the positive side of the primary winding 154. As shown, the IGBTs 136, 138, 140, and 142 are configured in an H-bridge arrangement and are coupled to the diodes 144, 146, 148, and 150, respectively. As discussed above, the switching of the IGBTs 136-142 may be controlled by the control logic 50 based upon the DC link voltage 44 to achieve a duty cycle that produces a desired output voltage. For instance, on the first half of a cycle, the IGBTs 136 and 142 may be switched on, and on the second half of the cycle, the IGBTs 138 and 140 may be switched on. This results in a switched DC square wave signal 60 that simulates a sine wave.

The switched DC output 60 of the IGBT H-bridge converter 56 is provided to the primary winding 154 of the transformer 62. The secondary winding 156 is centered tapped 72 (e.g., grounded) to providing a floating reference point for the DC output. As discussed above, the secondary winding 156 provides the DC switched signal 60 to the diode bridges 68 and 70, which rectify the switched DC signal 60 to produce the desired DC output 78. For instance, the diode bridge 68 may include the diodes 160, 164, 168, and 172, and the diode bridge 70 may include the diodes 162, 166, 170, and 174, configured as shown in FIG. 5. The output of diode bridges 68 and 70 may be filtered by the inductors 176 and 178, respectively, to produce the DC output signal 78 that is provided to the output terminals 88 which may be coupled to a power cable for delivering the DC output to a load, such as an aircraft (e.g., 12). That is, the inductors 176 and 178 may make up part of the filtering circuitry 76 of FIG. 4. Further, while only the inductors 176 and 178 are shown in FIG. 5, it should be appreciated that in other embodiments, the filtering circuitry 76 may also include capacitors, as well as a combination of capacitor and inductors.

As will be appreciated, embodiments of the GPU disclosed herein offer several technical advantages over conventional GPUs. For instance, the arrangement of components within the disclosed GPU 14 provides that the AC input signal is converted to a DC link signal and then to a switched DC signal prior to being transformed. This allows for the use of a single-phase transformer (e.g., transformer 62), which provides for reduced cost and overall equipment size compared to conventional GPUs, which commonly use bulky multi-phase transformers for transforming the AC input signal directly. In other words, one difference between the presently disclosed GPU 14 and certain conventional GPUs is that a transforming element is located downstream of a rectifier that receives the AC input.

Further, as discussed above, the GPU 14 utilizes a DC-to-DC converter 56 that operates at a high frequency of between approximately 10-20 kilohertz. This allows for the GPU 14 to accept 400 hertz AC input signals directly due to the controller being able to modulate the duty cycle as needed (e.g., "on the fly") according to the input frequency. In certain embodiments, input frequencies of between 10 hertz to 1000 hertz (1 kilohertz) may be accepted by the GPU 14. In contrast, conventional GPUs commonly accept only 50 or 60 hertz signals. Moreover, the DC-to-DC converter 56 is self-controlled in the sense that the duty cycle of the converter may be modulated independently of the AC input signal. Additionally, the DC-to-DC converter 56 utilizes zero volt switching, such that the pulse width of the switched DC output is modulated only when needed by the output load.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A ground power unit device comprising:
   an input bus that receives an alternating current (AC) input signal during operation;
   an output bus that outputs a direct current (DC) output signal produced from the AC input signal to a load having a power requirement during operation;
   a rectifier comprising a plurality of switches, wherein the rectifier receives the AC input signal from the input bus and converts the AC input signal to a DC link signal during operation, and wherein the DC link signal varies depending upon the frequency of the AC input signal and not upon the power requirement of the load at the output bus;
   a DC-to-DC converter that receives the DC link signal from the rectifier and outputs a switched DC signal during operation;
   a transformer comprising a primary winding and a secondary winding, wherein the transformer receives the switched DC signal from the DC-to-DC converter on the primary winding and outputs the switched DC signal from the secondary winding during operation;
   a first diode bridge and a second diode bridge coupled to the secondary winding, wherein the first and second diode bridges rectify the switched DC signal from the secondary winding to produce the DC output signal during operation; and
   a controller that, during operation, measures and determines the frequency of the AC input signal, controls the plurality of switches based at least partially upon the determined frequency of the AC input signal and not upon the power requirement of the load at the output bus, measures the DC link signal, and modulates a duty cycle of the DC-to-DC converter for producing the DC output signal based at least partially upon the measured DC link signal and the power requirement of the load at the output bus.

2. The ground power unit device of claim 1, wherein the plurality of switches comprises a plurality of silicon controlled rectifier (SCR) switches, and wherein during operation, the controller determines a switching sequence for the SCR switches.

3. The ground power unit device of claim 1, wherein the DC-to-DC converter comprises a first set of switches comprising a first insulated gate bipolar transistor (IGBT) and a second IGBT, and a second set of switches comprising a third IGBT and a fourth IGBT.

4. The ground power unit device of claim 3, wherein an emitter of the first IGBT and a collector of the second IGBT are coupled to a positive side of the primary winding, and wherein an emitter of the third IGBT and a collector of the fourth IGBT are coupled to a negative side of the primary winding.

5. The ground power unit device of claim 3, wherein controlling the duty cycle of the DC-to-DC converter comprises controlling the switching of the first, second, third and fourth IGBTs by switching the first and fourth IGBTs during the first half of a cycle of the duty cycle and switching the second and third IGBTs during the second half of the cycle.

6. The ground power unit device of claim 3, comprising:
a first capacitor coupled in parallel with the first and second IGBTs; and
a second capacitor coupled in parallel with the third and fourth IGBTs.

7. The ground power unit device of claim 1, comprising stabilization circuitry that improves at least one of power factor or harmonic characteristics of the DC link signal during operation.

8. The ground power unit device of claim 7, wherein the stabilization circuitry comprises an inductor coupled to the output of the rectifier.

9. The ground power unit device of claim 1, wherein the AC input is between approximately 200 to 600 volts, and wherein the AC input signal comprises a single-phase or a three-phase signal.

10. The ground power unit device of claim 1, wherein the line frequency of the AC input signal is 50 hertz, 60 hertz, or 400 hertz.

11. The ground power unit device of claim 1, wherein the secondary winding is center tapped to provide a reference point for the DC output voltage.

12. The ground power unit device of claim 1, wherein the DC output signal has a voltage selected from one of multiple voltages, wherein the selection is based upon a voltage corresponding to a power requirement of one of a plurality of respective aircraft.

13. A power system, comprising:
a power source that provides an alternating current (AC) input signal during operation; and
a ground power unit comprising:
an output terminal that supplies a direct current (DC) output signal produced from the AC input signal to power a load having a power requirement during operation;
a rectifier comprising a plurality of switches, wherein the rectifier receives the AC input signal from the power source and converts the AC input signal to a DC link signal during operation, and wherein the DC link signal varies depending upon the frequency of the AC input signal and not upon the power requirement of the load at the output terminal;
a DC-to-DC converter that receives the DC link signal from the rectifier and outputs a switched DC signal during operation;
a transformer comprising a primary winding and a secondary winding, wherein the transformer receives the switched DC signal on the primary winding and outputs the switched DC signal from the secondary winding during operation;
a first diode bridge and a second diode bridge coupled to the secondary winding, wherein the first and second diode bridges rectify the switched DC signal to produce the DC output signal during operation; and
a controller that, during operation, measures and determines the frequency of the AC input signal, controls the plurality of switches based at least partially upon the determined frequency of the AC input signal and not upon the power requirement of the load at the output terminal, measures the DC link signal, and modulates a duty cycle of the DC-to-DC converter for producing the DC output signal based at least partially upon the measured DC link signal and the power requirement of the load at the output terminal.

14. The power system of claim 13, wherein the power source comprises at least one of power grid or an engine-generator unit.

15. The power system of claim 13, wherein the load comprises a grounded aircraft.

16. The power system of claim 15, wherein the ground power unit is integrally coupled to a jet bridge and powers the grounded aircraft during operation when the jet bridge is connected to the grounded aircraft.

17. The power system of claim 13, wherein the DC-to-DC converter comprises first, second, third, and fourth insulated gate bipolar transistors (IGBTs) configured in an H-bridge arrangement, and wherein controlling the duty cycle of the DC-to-DC converter comprises controlling the switching of the first, second, third and fourth IGBTs by switching the first and fourth IGBTs and switching the second and third IGBTs in an alternating manner on first and second halves of the duty cycle.

18. The power system of claim 17, comprising a DC power supply unit that, during operation, receives the AC input signal and outputs at least two DC signals including a first DC signal for powering the controller and a second DC signal for switching the first, second, third, and forth IGBTs.

19. The power system of claim 13, wherein the first diode bridge comprises first, second, third, and fourth diodes coupled to a positive side of the secondary winding; and
wherein the second diode bridge comprises fifth, sixth, seventh, and eighth diodes coupled to a negative side of the secondary winding.

20. The power system of claim 19, comprising filtering circuitry that, during operation, filters the DC output signal produced by the first and second diode bridges.

21. The power system of claim 20, wherein the filtering circuitry comprises a first inductor coupled to the outputs of the first, second, fifth and sixth diodes, and a second inductor coupled to the outputs of the third, fourth, seventh, and eighth diodes.

22. The power system of claim 13, wherein the controller comprises a controller area network (CAN) interface.

23. The power system of claim 22, comprising a user interface board that communicates with the controller via the CAN interface during operation.

24. The power system of claim 23, wherein the user interface board communicates with a service terminal by at least one of a universal serial bus (USB), Ethernet, or RS-232 interface during operation.

25. The power system of claim 13, wherein the DC output signal has a voltage selected from one of multiple voltages, wherein the selection is based upon a voltage corresponding to a power requirement of one of a plurality of respective aircraft.

26. A method for supplying power to a grounded aircraft comprising:
receiving an alternating current (AC) input signal;
determining the frequency of the AC input signal;

receiving a power requirement of a load;

controlling a rectifier, based at least partially on the determined frequency of the AC input signal and not upon the power requirement of the load, to rectify the AC input signal to produce a direct current (DC) link signal, wherein the DC link signal varies depending upon the frequency of the AC input signal and not upon the power requirement of the load;

modulating a duty cycle of a DC-to-DC converter, based at least partially on the DC link signal and on the power requirement of the load, to convert the DC link signal to a switched DC signal using the DC-to-DC converter;

transforming the switched DC signal using a single-phase transformer; and rectifying the output of the single-phase transformer to produce a desired DC output signal from the AC input signal to meet the power requirement of the load.

27. The method of claim 26, wherein receiving the AC input signal comprises receiving the AC input signal from a power source comprising at least one of a power grid or an engine-generator unit.

28. The method of claim 26, comprising filtering the DC output signal using filtering circuitry to reduce at least one of current ripple or voltage ripple.

29. The method of claim 28, comprising transmitting the DC output signal using a power cable to power the grounded aircraft.

30. The method of claim 26, wherein the AC input signal is between approximately 200 to 600 volts, and wherein the DC output signal is between approximately 14 to 56 volts.

31. The method of claim 26, wherein the DC-to-DC converter operates at a frequency of between approximately 10 to 20 kilohertz.

32. The method of claim 26, wherein the AC input signal has a line frequency of between approximately 10 hertz to 1000 hertz.

33. The method of claim 26, wherein the desired DC output signal has a voltage selected from one of multiple voltages, wherein the selection is based upon a voltage corresponding to a power requirement of one of a plurality of respective aircraft.

* * * * *